(12) United States Patent
Schmidt et al.

(10) Patent No.: US 11,833,877 B2
(45) Date of Patent: Dec. 5, 2023

(54) SPRING DAMPER APPARATUS FOR A VEHICLE, IN PARTICULAR FOR A MOTOR VEHICLE, AND VEHICLE HAVING AT LEAST ONE SUCH SPRING DAMPER APPARATUS

(71) Applicant: AUDI AG, Ingolstadt (DE)

(72) Inventors: Walter Schmidt, Rennertshofen (DE); Michael Gradl, Gaimersheim (DE)

(73) Assignee: AUDI AG, Ingolstadt (DE)

( * ) Notice: Subject to any disclaimer, the term of this patent is extended or adjusted under 35 U.S.C. 154(b) by 99 days.

(21) Appl. No.: 17/563,131

(22) PCT Filed: Jun. 4, 2020

(86) PCT No.: PCT/EP2020/065458
§ 371 (c)(1),
(2) Date: Dec. 28, 2021

(87) PCT Pub. No.: WO2021/018441
PCT Pub. Date: Feb. 4, 2021

(65) Prior Publication Data
US 2022/0118814 A1 Apr. 21, 2022

(30) Foreign Application Priority Data
Aug. 1, 2019 (DE) .......................... 102019211502.0

(51) Int. Cl.
*B60G 17/08* (2006.01)
*B60G 15/06* (2006.01)

(52) U.S. Cl.
CPC .......... *B60G 17/08* (2013.01); *B60G 15/062* (2013.01); *B60G 2202/312* (2013.01);
(Continued)

(58) Field of Classification Search
CPC .................. B60G 17/08; B60G 15/062; B60G 2202/312; B60G 2204/40; B60G 2206/41;
(Continued)

(56) References Cited

U.S. PATENT DOCUMENTS 4,153,237 A * 5/1979 Supalla .................. B60G 17/04
188/266.8
4,478,431 A * 10/1984 Muller ................... B60G 15/00
280/124.159
(Continued)

*Primary Examiner* — Paul N Dickson
*Assistant Examiner* — Timothy Wilhelm
(74) *Attorney, Agent, or Firm* — Maier & Maier, PLLC

(57) ABSTRACT

A spring damper apparatus for a vehicle, with a hydropneumatic system, via which a wheel of the vehicle can be braced spring-mounted and damped on a body of the vehicle. The hydropneumatic system includes a first chamber delimited at least partially by a partition element, in which a fluid acting on the partition element is accommodated. In addition, the hydropneumatic system includes a second chamber separated from the first chamber by the partition element and delimited by the partition element, in which a gas forming a gas spring and acting on the partition element is accommodated. In addition, the hydropneumatic system includes a housing in which the fluid is accommodated. In addition, the hydropneumatic system includes a piston shiftably accommodated in the housing and acting on the fluid, via which piston the wheel can be braced on the body.

20 Claims, 2 Drawing Sheets

(52) U.S. Cl.
CPC ...... *B60G 2204/40* (2013.01); *B60G 2206/41* (2013.01); *B60G 2500/30* (2013.01); *B60G 2800/162* (2013.01); *B60G 2800/914* (2013.01)

(58) Field of Classification Search
CPC .......... B60G 2500/30; B60G 2800/162; B60G 2800/914; B60G 17/017; B60G 2202/154; B60G 2206/4222; B60G 2800/20; F16F 9/08; F16F 9/56; F16F 9/064; F16F 9/061
See application file for complete search history.

(56) References Cited

U.S. PATENT DOCUMENTS

| | | | | |
|---|---|---|---|---|
| 4,655,440 | A * | 4/1987 | Eckert | F16F 9/096 188/266.5 |
| 5,009,451 | A * | 4/1991 | Hayashi | B60G 17/0272 267/221 |
| 5,116,077 | A * | 5/1992 | Karnopp | B60G 17/0185 280/5.502 |
| 5,401,053 | A * | 3/1995 | Sahm | B60G 17/016 267/221 |
| 5,957,252 | A * | 9/1999 | Berthold | B60G 11/30 188/314 |
| 6,076,837 | A * | 6/2000 | Kokotovic | B60G 21/0553 280/5.511 |
| 6,669,216 | B1 * | 12/2003 | Elser | B60G 17/0432 280/124.159 |
| 6,676,119 | B2 * | 1/2004 | Becker | B60G 17/0272 267/218 |
| 7,591,352 | B2 * | 9/2009 | Hanawa | F16F 9/464 188/266.6 |
| 7,779,974 | B2 * | 8/2010 | Timoney | B60G 17/0432 188/312 |
| 7,857,325 | B2 * | 12/2010 | Copsey | B60G 11/15 280/6.157 |
| 7,967,117 | B2 * | 6/2011 | Abe | F16F 9/3207 267/218 |
| 8,047,340 | B2 * | 11/2011 | Abe | B60G 15/14 188/266.6 |
| 8,627,932 | B2 * | 1/2014 | Marking | F16F 9/5126 188/266.6 |
| 8,783,696 | B2 * | 7/2014 | Murakami | B62K 25/00 267/221 |
| 8,807,542 | B2 * | 8/2014 | Galasso | F16F 9/065 280/124.16 |
| 8,857,580 | B2 * | 10/2014 | Marking | F16F 9/19 188/266.2 |
| 8,955,653 | B2 * | 2/2015 | Marking | B60G 17/08 188/269 |
| 9,180,746 | B2 * | 11/2015 | Kasuga | B60G 17/015 |
| 9,239,090 | B2 * | 1/2016 | Marking | F16F 9/516 |
| 9,556,925 | B2 * | 1/2017 | Marking | B60G 17/08 |
| 9,784,333 | B2 * | 10/2017 | Marking | B60G 13/08 |
| 10,406,883 | B2 * | 9/2019 | Marking | F16F 9/066 |
| 10,981,429 | B2 * | 4/2021 | Tsiaras | F16F 9/56 |
| 11,400,790 | B2 * | 8/2022 | Rajan | B60G 17/0272 |
| 11,448,283 | B2 * | 9/2022 | Strickland | F16F 9/469 |
| 11,499,601 | B2 * | 11/2022 | Marking | F16F 9/466 |
| 2002/0121416 | A1 * | 9/2002 | Katayama | F16F 9/096 188/315 |
| 2016/0153516 | A1 * | 6/2016 | Marking | F16F 9/348 188/281 |
| 2016/0319897 | A1 * | 11/2016 | Mochizuki | F16F 9/096 |
| 2018/0010666 | A1 * | 1/2018 | Marking | B60G 13/06 |
| 2021/0146739 | A1 * | 5/2021 | Schmidt | B60G 15/062 |
| 2021/0162828 | A1 * | 6/2021 | Koenig | B60G 11/16 |
| 2022/0118814 | A1 * | 4/2022 | Schmidt | F16F 9/08 |
| 2022/0126644 | A1 * | 4/2022 | Randall | B60G 13/08 |
| 2022/0163088 | A1 * | 5/2022 | Gagnon | F16F 9/342 |
| 2022/0410646 | A1 * | 12/2022 | Taheri | B60G 13/10 |
| 2023/0067895 | A1 * | 3/2023 | Schweisthal | B60G 15/12 |
| 2023/0080108 | A1 * | 3/2023 | Timoney | F16F 9/3235 |

\* cited by examiner

SPRING DAMPER APPARATUS FOR A VEHICLE, IN PARTICULAR FOR A MOTOR VEHICLE, AND VEHICLE HAVING AT LEAST ONE SUCH SPRING DAMPER APPARATUS

FIELD

The invention relates to a spring damper apparatus for a vehicle, in particular for a motor vehicle. Moreover, the invention relates to a vehicle, in particular to a motor vehicle.

BACKGROUND

DE 10 2017 110 178 A1 discloses a device for the level adjustment of a vehicle body, including a damper and a spring element, wherein the damper and the spring element are spatially arranged in parallel between a support surface and a switchable active input distribution unit. DE 10 2015 119 637 A1 discloses a motor vehicle chassis including a base structure and multiple wheels connected to it in each case via a wheel suspension. In addition, DE 10 2016 112 296 A1 discloses a motor vehicle chassis.

SUMMARY

The aim of the present invention is to create a spring damper apparatus for a motor vehicle as well as a vehicle, so that a particularly simple height adjustment of a body of the vehicle can be implemented.

A first aspect of the invention relates to a spring damper apparatus for a vehicle preferably designed as a motor vehicle, in particular as a car and here preferably as a passenger car. The spring damper apparatus includes a hydropneumatic system, via which at least one wheel of the vehicle, also referred to as vehicle wheel can be braced spring-mounted and damped on a body of the vehicle, which is designed, for example, as a self-supporting body. This means that the vehicle, in its completely manufactured state, comprises the body which is preferably designed as a self-supporting body. In addition, the vehicle, in its completely manufactured state, includes the spring damper apparatus and thus the hydropneumatic system. In addition, the vehicle, in its completely manufactured state, includes the wheel via which, for example, the vehicle, in the completely manufactured state of the vehicle, can be braced or is braced in vehicle vertical direction downward on a ground. The wheel is thus a ground contact element which, for example, when the vehicle is moved along the ground, rolls on the ground while the vehicle in vehicle vertical direction is braced downward via the wheel on the ground. The spring damper apparatus, in particular the hydropneumatic system, allows, for example, in particular relative movements occurring at least in vehicle vertical direction between the wheel and the body, so that, for example, the wheel can spring in and out and can thus move at least in vehicle vertical direction relative to the body. For example, the springing in is damped by means of the hydropneumatic system. Alternatively or in addition, for example, the springing out of the wheel is brought about or assisted by means of the hydropneumatic system.

For this purpose, the hydropneumatic system comprises a first chamber which is at least partially, in particular directly, delimited by a partition element. In the first chamber, a fluid, such as, for example, an oil, acting on the partition element is accommodated. The feature that the fluid accommodated in the first chamber acts on the partition element is understood to mean in particular that the fluid can at least indirectly, in particular directly, exert a force or a pressure on the partition element. In particular, the feature that the first chamber is at least partially delimited directly by the partition element is understood to mean that the fluid accommodated in the first chamber directly touches or contacts the partition element. As a result, for example, the fluid can directly exert a force or a pressure on the partition element.

In addition, the hydropneumatic system comprises a second chamber which is separated from the first chamber by the partition element and is at least partially delimited, in particular directly delimited, by the partition element. In the second chamber, a gas acting on the partition element is accommodated, by means of which a gas spring of the hydropneumatic system is formed. The gas is, for example, air or nitrogen. In other words, the gas can include, for example, air and/or nitrogen. The feature that gas acts on the partition element can be understood in particular to mean that the gas accommodated in the second chamber can at least indirectly, in particular directly, exert a pressure or a force on the partition element. In particular, for example, the feature that the second chamber is directly delimited at least partially by the partition element can be understood to mean that the gas accommodated in the second chamber directly touches or contacts the partition element, so that, for example, the gas can exert the force or the pressure directly on the partition element. The first chamber and thus the fluid are arranged, for example, on a first side of the partition element, wherein, for example, the second chamber and thus the gas are arranged on a second side of the partition element, which is opposite the first side or faces away from the first side. Thus, for example, the force or pressure which is exerted at least indirectly, in particular directly, by the fluid on the partition element, in particular on the first side, and which is also referred to as first force or first pressure acts in a first direction. In addition, for example, the force or the pressure which is at least indirectly, in particular directly, exerted by the gas or the pressure on the partition element, in particular on the second side, and which is also referred to as second force or second pressure, acts in a second direction opposite the first direction.

In addition, the hydropneumatic system includes a housing in which a fluid is accommodated. Thus, the fluid is accommodated in particular partially in the housing and in particular partially in the second chamber. The hydropneumatic system, in addition, comprises a piston which is shiftably accommodated in the housing and which acts on the fluid accommodated in the housing. This means that the piston is accommodated in the housing and can be shifted relative to the housing, that is to say it can be moved by translation relative to the housing. The feature that the piston acts on the fluid accommodated in the housing can be understood in particular to mean that the piston can at least indirectly, in particular directly, exert a force, in particular a third force, or a pressure, in particular a third pressure, on the fluid accommodated in the housing. Above the piston, the wheel can be braced or is braced on the body. Thus, for example, the aforementioned relative movements between the wheel and the body entail relative movements, in particular relative shifts, between the piston and the housing. In other words, if the wheel, for example, springs in and out, so that the wheel, for example, in particular in the vehicle vertical direction, is moved relative to the body, then the piston is shifted thereby in the housing relative to the housing.

By shifting of the piston relative to the housing, by means of the piston, a pressure can be exerted on the fluid accommodated in the housing and in the first chamber. In other words, if the piston is shifted relative to the housing, then the piston thereby exerts at least indirectly, in particular directly, a pressure on the fluid accommodated in the housing and in the first chamber. As a result, by means of the piston, via the fluid, the partition element can be moved at least partially, whereby a volume reduction of the second chamber and thereby a compression of the gas or of the gas spring in the second spring can be brought about. If the piston exerts the pressure on the fluid, then this pressure is transmitted via the fluid onto the partition element, whereby the partition element is at least partially moved, the volume of the second chamber is reduced, and thereby the gas or the gas spring is compressed, that is to say loaded. The feature that the partition element can be moved at least partially can be understood to mean that the partition element is, for example, elastically deformable or deformed. In other words, the partition element is elastically deformable. The partition element is designed, for example, as a membrane, in particular as an elastically deformable membrane. If the pressure is then exerted by the piston on the fluid and by the fluid on the partition element, in particular the membrane, then thereby, for example, the membrane is elastically deformed, in particular in such a manner that thereby the volume reduction of the second chamber and thus the compression of the gas are brought about. Furthermore, it is conceivable that, since the pressure can be or is exerted by the piston on the fluid and by the fluid on the partition element, the partition element can be moved or is moved in such a manner that the volume reduction of the second chamber is brought about, in particular while there is no deformation of the partition element. Thus, the partition element, for example, cannot be elastically deformed.

If—as described above—the vehicle is braced via the wheel in vehicle vertical direction downward on the ground, then, for example, the body comprises a clearance from the ground, in particular extending in vehicle vertical direction. In other words, the clearance extends in vehicle vertical direction between the body and the ground, wherein the clearance is also referred to as height, vehicle height, body height, level, vehicle level or body level.

In order then to able to particularly simply adjust the clearance between the body and the ground particularly simply and thus be able to implement a height adjustment of the body, also referred to as vehicle body, the spring damper apparatus according to the invention includes at least one sliding element provided in addition to the piston and thus different from the piston and shiftable relative to the housing, that is to say movable by translation, which is also preferably provided in addition to the partition element and thus different from the partition element. Preferably, the sliding element can also be shifted relative to the partition element. By means of the sliding element, for the height adjustment of the body, by shifting of the sliding element relative to the housing, at least a portion of the fluid accommodated in particular initially in the housing can be conveyed out of the housing, and additional fluid can be conveyed into the housing. Alternatively, for the height adjustment of the body, by shifting of the sliding element relative to the housing, by means of the sliding element, a fluid column which is formed by fluid accommodated in the housing and which is accommodated in the housing can be shifted relative to the housing. In other words, by means of the sliding element, by shifting of the sliding element relative to the housing, a volume of the fluid, also referred to as fluid volume, can be shifted, in particular in such a manner that the fluid volume is shifted within the housing or else shifted into the housing and out of the housing. By this shifting of the fluid volume, the clearance can be adjusted, that is to say changed, whereby a particularly simple and cost-effective height adjustment of the body can be obtained. In particular, the invention makes it possible to change the height of the body and thus adjusted it as needed, without using or having to use an involved adjustment of a spring base point and/or cost-, weight- and installation space-intensive systems. Since the height of the body can be set, that is to say changed, by shifting of the fluid volume, according to the invention a hydraulic and particularly simple height adjustment of the body can be obtained.

Here, it has been shown to be particularly advantageous if the hydropneumatic system is designed as a partially supporting or fully supporting hydropneumatic system, the gas spring of which at least partially, in particular completely, absorb a load of the vehicle, in particular, for example, the unloaded weight of the vehicle when the vehicle is at a standstill, whereby the gas spring is preloaded, in particular in the unloaded weight state of the vehicle and when the vehicle is at a standstill. In other words, for example, if the vehicle is at a standstill and the vehicle, while at a standstill, is standing on the aforementioned ground, so that the vehicle in vehicle vertical direction is braced downward via the wheel on the ground, and if the vehicle is here, for example, unloaded, then the vehicle is in its unloaded weight state. If the hydropneumatic system is then designed as partially supporting hydropneumatic system, then the partially supporting hydropneumatic system, in particular the gas spring thereof, absorbs only a portion of the load or unloaded weight, whereby the gas spring is preloaded. If the hydropneumatic system is designed as a full bearing hydropneumatic system, then the full bearing hydropneumatic system, in particular the gas spring thereof, absorbs the entire unloaded weight. In this case as well, the gas spring is preloaded. If the hydropneumatic system were designed as a non-supporting conventional damper, then the non-supporting conventional damper, in particular the gas spring thereof, would not absorb the entire load or unloaded weight, so that the gas spring, in the case of a load or unloaded weight and when the vehicle is at a standstill, would be in particular completely relaxed at least almost. However, since it is then preferably provided that the gas spring is preloaded in particular by the wheel load, for example, in the unloaded weight state and at a standstill, then the height of the body can be adjusted, in particular increased, without additional compression of the gas spring occurring or so that only a very slight additional compression of the gas spring occurs, or in the case of only minimal change of the preloading of the gas spring. In addition, thereby, the height of the body can be adjusted particularly rapidly. If the hydropneumatic system were designed as a non-supporting conventional damper, then the shifting of the fluid volume would then possibly lead to a compression of the gas spring without a height adjustment of the body occurring or without the initially unloaded gas spring initially having to be loaded or preloaded, so that only after such a loading or preloading of the gas spring would a change, in particular an increase, of the height of the body occur. In contrast, by using a fully or partially supporting hydropneumatic system, the height of the body can be particularly extensively and/or particularly rapidly changed, in particular increased.

An additional embodiment is characterized in that, in the hydropneumatic system designed as a partially supporting hydropneumatic system, the gas spring of which absorbs the load, in particular the unloaded weight of the vehicle when the vehicle is at a standstill, as a first portion, whereby the gas spring, in particular in the unloaded weight state and when the vehicle is at a standstill, is preloaded, in particular at least one or exactly one mechanical spring is associated, which absorbs the load, in particular the unloaded weight of the vehicle when the vehicle is at a standstill, as a second portion, whereby the mechanical spring is preloaded, in particular in the unloaded weight state and when the vehicle is at a standstill. In other words, in this embodiment, it is provided that the hydropneumatic system is designed as a partially supporting hydropneumatic system and that the spring damper apparatus includes a mechanical spring associated with the partially supporting hydropneumatic system. The mechanical spring is made, for example, of a metallic material, a plastic or a fiber-reinforced plastic. Thus, the gas spring of the partially supporting hydropneumatic system assumes a first portion of the load, in particular of the unloaded weight, of the vehicle, in particular at a standstill, and the mechanical spring assumes a second portion of the load, in particular of the unloaded weight, of the vehicle, in particular at a standstill. Thus, both the gas spring and the mechanical spring, for example, in the unloaded weight state and when the vehicle is at a standstill, are preloaded. Thereby, a particularly extensive and rapid change, in particular increase, of the height of the body can be implemented.

Moreover, by using the mechanical spring, a particularly advantageous drivability can be ensured. In particular, by using the mechanical spring and thus by designing the hydropneumatic system as a partially supporting hydropneumatic system, undesired effects such as, for example, excessive stiffening of the hydropneumatic system alone can be prevented, both during springing in and springing out movements of the wheel and also during a change of the height of the body.

It has been shown to be particularly advantageous if the spring damper apparatus, in particular the hydropneumatic system, comprises a reservoir chamber provided in addition to the first chamber and arranged outside of the housing and preferably outside of the first chamber, which is delimited partially by a reservoir housing provided in addition to the housing and arranged, for example, outside of the housing and outside of the first chamber, and delimited partially by the sliding element which can be shifted relative to the reservoir housing. This means that the sliding element is shiftable relative to the reservoir housing and relative to the housing, that is to say it is movable by translation. By means of the sliding element, for the height adjustment of the body, by shifting of the sliding element relative to the housing and relative to the reservoir housing, at least the portion of the fluid can be conveyed out of the housing and into the reservoir, in particular into the reservoir housing, and the additional fluid can be conveyed out of the reservoir chamber, in particular out of the reservoir housing, and into the housing. Here, it is provided in particular that the housing and the reservoir housing are fluidically connected to one another, so that, for example, the fluid can flow out of the reservoir housing and into the housing and flow out of the housing and into the reservoir housing. Thereby a particularly adequate, simple and extensive change of the height of the body can be implemented.

In order to be able to implement the height adjustment of the body particularly simply and thus cost-effectively, it is preferably provided that the reservoir housing which is designed in particular separately from the damper housing is immobile relative to the housing.

Here it been shown to be particularly advantageous if the reservoir housing is secured at least indirectly, in particular directly, on the housing which is also referred to, for example, as damper housing, and is thereby immobile relative to the housing. As a result, the reservoir housing can be moved, for example, along with the housing relative to the body, in particular during springing in and springing out movements of the wheel. Thereby, the space requirement can be kept low.

In order to be able to implement the height adjustment particularly cost-effectively, it is provided, in an additional embodiment of the invention, that the reservoir housing is immobile relative to the body.

In order to be able to keep the costs particularly low here, it is provided, in an additional embodiment of the invention, that the reservoir housing is at least indirectly, in particular directly, secured on the body and thereby be immobile relative to the body.

In order to be able to keep the number of parts and thus the costs, the space requirement and the weight particularly low, it is provided, in an additional embodiment of the invention, to arrange the sliding element in the housing, in particular opposite the piston, so that, for the height adjustment of the body, by means of the sliding element, by shifting of the sliding element relative to the housing, the liquid column accommodated in the housing can be shifted relative to the housing.

A second aspect of the invention relates to a vehicle which comprises a body designed preferably as self-supporting body, at least one wheel, and at least one spring damper apparatus, in particular according to the first aspect of the invention. The spring damper apparatus includes a hydropneumatic system, via which the wheel is braced spring-mounted and damped on the body, in particular along a bracing direction. The bracing direction extends, for example, at least substantially in the vehicle vertical direction. Here, the hydropneumatic system comprises a first chamber delimited at least partially by a partition element, in which a fluid acting on the partition element is accommodated. In addition, the hydropneumatic system comprises a second chamber separated from the first chamber by the partition element and delimited at least partially by the partition element, in which a gas forming a gas spring and acting on the partition element is accommodated. The hydropneumatic system moreover includes a housing in which the fluid is accommodated. Moreover, the hydropneumatic system comprises a piston which is shiftably accommodated in the housing and which acts on the fluid accommodated in the housing, via which piston the wheel is braced on the body. By shifting of the piston relative to the housing, a pressure can be exerted on the fluid accommodated in the housing and in the first chamber, whereby, via the fluid, the partition element can be at least partially moved. As a result, a volume reduction of the second chamber and thereby a compression of the gas or of the gas spring in the second chamber can be brought about.

In order then to be able to implement in a particularly simple way a height adjustment of the body, in the second aspect of the invention, it is provided that the spring damper apparatus comprises at least one sliding element provided in addition to the piston and shiftable relative to the housing, by means of which, for the height adjustment of the body, by shifting of the sliding element relative to the housing, at least a portion of the fluid can be conveyed out of the housing and additional fluid can be conveyed into the housing. Alternatively, for the height adjustment of the body, by means of the sliding element, by shifting of the sliding element relative to the housing, a fluid column which is formed by the fluid accommodated in the housing and which is accommodated in the housing can be shifted relative to the housing. Advantages and advantageous embodiments of the first aspect of the invention are to be considered advantages and advantageous embodiments of the second aspect of the invention and vice versa.

The invention also includes developments of the vehicle according to the invention, comprising features as have already been described in the context of the developments of the spring damper apparatus according to the invention. For this reason, the corresponding developments of the vehicle according to the invention are not described again here.

The vehicle according to the invention is preferably designed as motor vehicle and here as a car. In particular, the motor vehicle can be a passenger van or a truck or a motorcycle. The invention also includes the combinations of the features of the described embodiments.

BRIEF DESCRIPTION OF THE FIGURES

Below, embodiment examples of the invention are described. For this purpose, the figures show.

DETAILED DESCRIPTION

Figure 1:
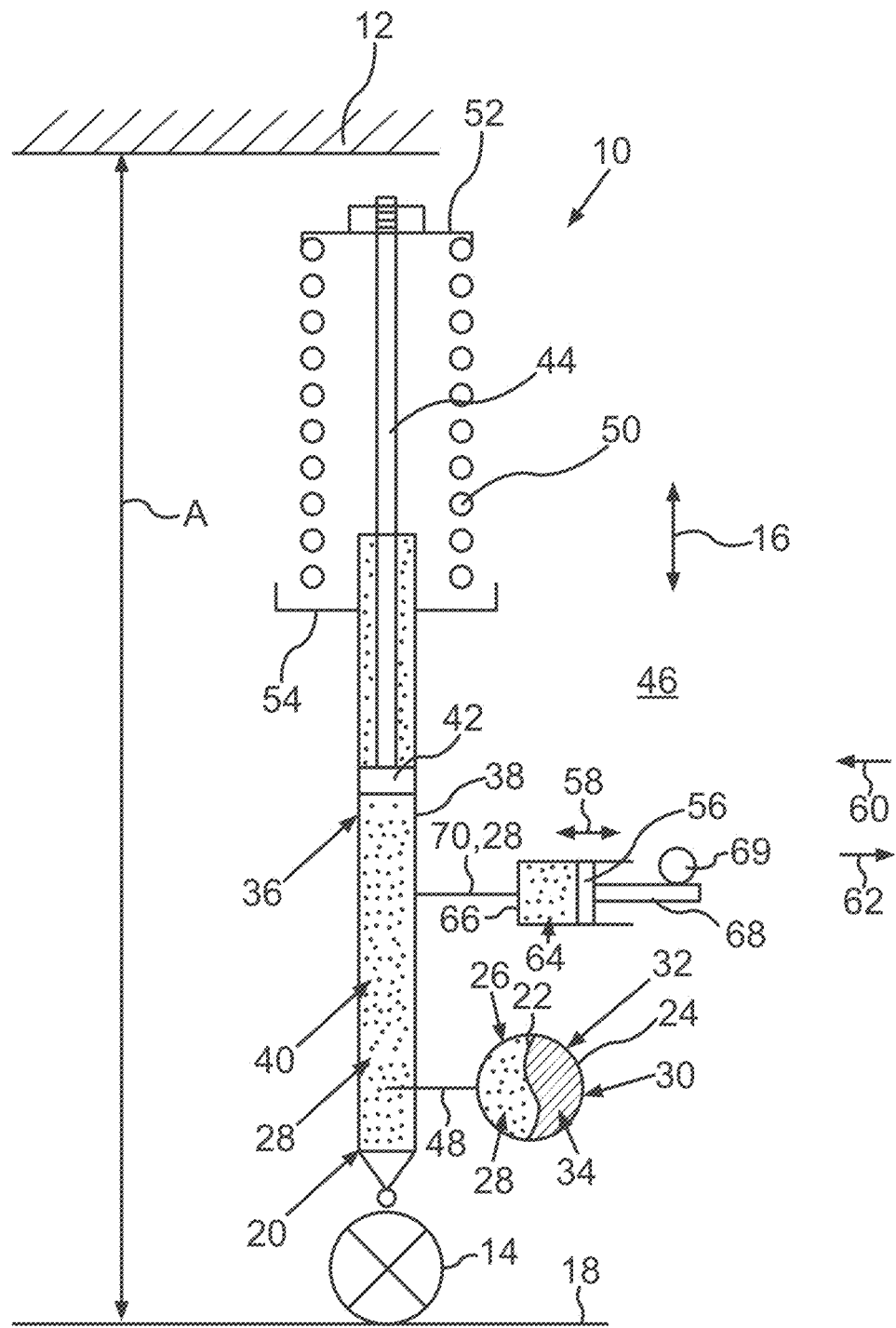
FIG. 1 a diagrammatic and sectional side view of a spring damper apparatus according to the invention according to a first embodiment.

The embodiment examples explained below are preferred embodiments of the invention. In the embodiment examples, the described components of the embodiments in each case represent individual features of the invention to be considered independently of one another, which in each case also develop the invention independently of one another. Therefore, the disclosure is also intended to include combinations of the features of the embodiments other than those represented. Moreover, the described embodiments can also be supplemented by more of the already described features of the invention.

In the figures, identical reference numerals in each case denote functionally equivalent elements.

FIG. 1 shows, in a diagrammatic and sectional side view, a spring damper apparatus 10 for a vehicle. The vehicle, in its completely manufactured state, comprises a body 12 represented in particular diagrammatically in FIG. 1 and designed, for example, as self-supporting body, the spring damper apparatus 10, and at least one wheel 14 represented in particular diagrammatically in FIG. 1 and also referred to as vehicle wheel. As explained in further detail below, the wheel 14 can be or is braced spring-mounted and damped on the body 12 via the spring damper apparatus 10, in particular at least or exclusively along a bracing direction shown in FIG. 1 by a double arrow 16. The bracing direction extends, for example, at least substantially in vehicle vertical direction.

The wheel 14 is a ground contact element via which the vehicle at a standstill can be or is braced in vehicle vertical direction downward on a ground 18. If the vehicle, for example, is moved along the ground 18, while the vehicle is braced in vehicle vertical direction downward via the wheel 14 on the ground 18, then the wheel 14 rolls on the ground 18. In addition, the vehicle, in its unloaded state, has a so-called unloaded weight which is braced at least partially in vehicle vertical direction downward via the spring damper apparatus on the ground 18, in particular when the vehicle is at a standstill.

The spring damper apparatus 10 comprises a hydropneumatic system 20, via which the wheel 14 is braced spring-mounted and damped on the body 12 at least or exclusively along the bracing direction. Here, the hydropneumatic system 20 comprises a first chamber 26 partially delimited by a partition element 22 and partially delimited by a designated hydraulic housing 24, in which a fluid 28 acting on the partition element 22 is accommodated. The fluid 28 is, for example, a non-compressible fluid. In particular, the fluid 28 can be an oil. The fluid 28 is also referred to as hydraulic fluid or hydraulic oil.

In addition, the hydropneumatic system 20 comprises a second chamber 30 separated from the first chamber 26 by the partition element 22, partially delimited by the partition element 22 and partially delimited by the hydraulic housing 24, in which a gas 32 forming a gas spring 34 is accommodated. The gas 32 includes, for example, at least or exclusively air and/or at least or exclusively nitrogen. FIG. 1 shows the spring damper apparatus 10 according to a first embodiment. In the first embodiment, the separating element 22 is designed as a membrane, in particular an elastically deformable membrane, which, for example, in its marginal region, is at least indirectly, in particular directly, connected to the hydraulic housing 24 and thus fastened on the hydraulic housing 24. The partition element 22 can be elastically deformed. By elastic deformation of the partition element 22, the partition element 22 is moved at least partially relative to the hydraulic housing 24.

The hydropneumatic system 20 moreover comprises a damper 36, also referred to as shock absorber, for example. The damper 36 and thus the hydropneumatic system 20 comprise a housing 38, also referred to as damper housing. As can be seen in FIG. 1, the housing 38 and the hydraulic housing 24 are designed separately from one another, wherein the hydraulic housing 24 is arranged outside of the housing 38. Accordingly, the chambers 26 and 30 are arranged outside of the housing 38, in particular outside of a work chamber 40. Thus, the hydraulic housing 24 is arranged outside of the work chamber 40. The work chamber 40 is partially delimited by the housing 38 and partially delimited by a piston 42 of the damper 36. This means that the damper 36 and thus the hydropneumatic system 20 comprise the piston 42. The piston 42 is here shiftably accommodated in the housing 38 and thus can be shifted along a first movement direction, shown, for example, by the double arrow 16, relative to the housing 38. The damper 36 moreover includes a piston rod 44 which can be shifted along with the piston 42 along the first movement direction relative to the housing 38 and protrudes out of the housing 38 in its vicinity 46.

In addition, the wheel 14 is at least indirectly fastened to the housing 38. In addition, the piston 42 is fastened via the piston rod 44 to the body 12. Overall, it can be seen that the wheel 14 can be braced or is braced spring-mounted and damped on the body 12 via the damper 36 and thus via the housing 38, the piston 42 and the piston rod 44. Here, the fluid 28 is also accommodated in the work chamber 40 and thus in the housing 38 or in the damper 36. The housing 38, in particular the work chamber 40, is fluidically connected, for example, via at least one conduit element 48, to the hydraulic housing 24, in particular to the first chamber 26. In addition, from FIG. 1 it can be seen that the gas 32 and thus the gas spring 34 act on the partition element 22 and the fluid 28 acts on the partition element 22. In addition, the piston 42 acts on the fluid 28 in the housing 38. Because the piston 42 is shiftable relative to the housing 38 along the first movement direction. the damper 36 and thus the hydropneumatic system 20 allow relative movements occurring along the movement direction and thus, for example, in vehicle vertical direction, between the wheel 14 and the body 12, so that, in the context of these relative movements, the wheel 14 can spring in and out relative to the body 12. By springing in of the wheel 14, that is to say in particular when the wheel 14 is moved in vehicle vertical direction upward relative to the body 12 and is thus moved toward the body 12, the piston rod 44 is retracted into the housing 38. This entails a volume reduction of the work chamber 40, whereby at least a portion of the fluid 28 initially accommodated in the housing 38, in particular in the work chamber 40, is shifted out of the work chamber 40 by means of the piston 42 and shifted into the chamber 26. Thereby, the partition element 22 is at least partially moved, in particular elastically deformed, in such a manner that a volume reduction of the chamber 30 occurs. Thereby, the gas 32 accommodated in the chamber 30 and thus the gas spring 34 accommodated therein are compressed, that is to say loaded. If the wheel 14 springs out, that is to say if the wheel 14 moves, in particular along the movement direction, along the bracing direction or in vehicle vertical direction relative to the body 12, downward and thus away from the body 12, then, thereby, the piston rod 44 is moved at least partially out of the housing 38. This entails a volume increase of the work chamber 40, so that, into the work chamber 40 and thus into the housing 38, at least a portion of the fluid 28 initially accommodated in the chamber 26 is conveyed out of the chamber 26 and into the work chamber 40, in particular into the housing 38. Here, the fluid 28 can flow out of the work chamber 40 via the conduit element 48 into the chamber 26, and the fluid 28 can flow out of the chamber 26 via the conduit element 48 into the work chamber 40. Overall, it can be seen that, by means of the piston 42, by shifting of the piston 42 relative to the housing 38, a pressure can be or is exerted on the fluid 28 accommodated in the housing 38, in particular in the work chamber 40, in the first chamber 26 when the piston rod 44 is retracted into the housing 38, that is to say, for example, when the wheel 14 springs in or is moved, in particular along the movement direction, toward the body 12. By this exertion of the pressure on the fluid 28 accommodated in the housing 38 and in the first chamber 26, the partition element 22 is or will be at least partially moved, since the pressure exerted on the fluid 28 is exerted or acts by the fluid 28 on the partition element 22, that is to say it is transmitted via the fluid 28 onto the partition element 22. By this at least partial movement of the partition element 22, a first volume reduction of the second chamber 30 can be or is brought about, whereby the gas 32 and thus the gas spring 34 in the second chamber 30 are compressed and thus loaded.

During the springing out of the wheel 14, since at least a portion of the fluid 28 initially accommodated in the chamber 26 is conveyed via the conduit element 48 into the work chamber 40, the partition element 22 can be moved or in particular at least partially relaxed in such a manner that a volume increase of the chamber 30 and thus a partial relaxation of the gas 32 or gas spring 34 occurs.

In the first embodiment, the hydropneumatic system 20 is designed as a partially supporting hydropneumatic system, the gas spring 34 of which, for example, when the vehicle is at a standstill, absorbs a load, in particular an unloaded weight, of the vehicle as a first portion, whereby the gas spring 34, in particular in the unloaded weight state and at a standstill of the vehicle, is preloaded. For this purpose, associated with the partially supporting hydropneumatic system 20 is a mechanical spring 50, via which the wheel 14 can be braced or is braced in particular spring-mounted on the body 12, in particular along the bracing direction or along the movement direction. In the embodiment example shown in FIG. 1, the first movement direction coincides with the bracing direction. On the one hand, the mechanical spring 50 can be braced or is braced, at least indirectly, in particular directly, on the body 12, along the first movement direction or along the bracing direction. In the present case, on the one hand, the mechanical spring 50 can be or is braced on the body 12 via a first spring plate 52 along the bracing direction. On the other hand, the mechanical spring 50 is or can be at least indirectly, in particular directly, braced on the housing 38 along the first movement direction or along the bracing direction. For this purpose, on the housing 38, a second spring plate 54 is secured, which is spaced along the bracing direction from the first spring plate 52. Since the hydropneumatic system 20 is a partially supporting hydropneumatic system, for example, at a standstill of the vehicle, the mechanical spring 50 absorbs the load, in particular the unloaded weight, as a second portion, so that both the gas spring 34 and the mechanical spring 50 are preloaded, in particular in the unloaded weight state and at a standstill of the vehicle.

In FIG. 1, a clearance extending in vehicle vertical direction between the body 12 and the ground 18 is designated with A. The clearance A is also designated as height or level of the body 12.

In order then to implement a particularly simple height adjustment of the body 12, that is to say in order then to be able to adjust and thus vary the clearance A in a particularly simple way, the spring damper apparatus 10 includes at least one sliding element 56 provided in addition to the piston 42 and in addition to the housing 38 and in addition to the partition element 22 and in addition to the hydraulic housing 24, which can be shifted relative to the housing 38 along a second movement direction shown in FIG. 1 by a double arrow 58, that is to say it can be moved by translation. In the embodiment example shown in FIG. 1, the second movement direction extends at a slant or in the present case perpendicularly with respect to the first movement direction. Furthermore, it is conceivable that the first movement direction coincides with the second movement direction, or vice versa. As explained in greater detail below, in the first embodiment, by means of the sliding element 56, by shifting of the sliding element 56 relative to the housing 38, at least a portion of the fluid 28 can be conveyed out of the housing 38, and, in addition, fluid 28 can be conveyed into the housing 38, whereby the spacing A can be varied, that is to say whereby the height of the body 12 can be adjusted. In the context of the height adjustment, the clearance A can be, for example, increased, whereby at least a portion of the body 12 is moved in vehicle vertical direction upward away from the ground 18. For this purpose, for example, in addition to the fluid 28, the sliding element 56 is shifted by means of the sliding element 56 into the housing 38, in particular into the work chamber 40, in a first direction shown by an arrow 60 and extending parallel to the second movement direction. Furthermore, in the context of the height adjustment, it is conceivable to reduce the clearance A, whereby the body 12 is moved in vehicle vertical direction downward toward the ground 18. For this purpose, for example, at least a portion of the fluid 28 initially accommodated in the housing 38, in particular in the work chamber 40, is thereby conveyed out of the housing 38, in particular out of the work chamber 40, in that the sliding element 56 is shifted or displaced in a second direction opposite the first direction, shown by an arrow 60 in FIG. 1 and extending parallel to the second movement direction. Since the hydropneumatic system 20 is at least partially supporting or partially/fully supporting, when additional fluid 28 is conveyed into the work chamber 40, the piston rod 44 is moved out of the housing 38, whereby the clearance A is increased or the body 12 is raised, without the gas spring 34 being further loaded here or wherein the gas spring 34 keeps being loaded only slightly.

In the first embodiment, the spring damper apparatus 10 includes a reservoir chamber 64 provided in addition to the chambers 26 and 30 and in addition to the work chamber 40, and arranged outside of the chambers 26 and 30 and outside of the work chamber 40, which reservoir chamber is partially delimited by a reservoir housing 66 provided in addition to the housing 38, in addition to the piston 42 and in addition to the hydraulic housing 24, and partially delimited by the sliding element 56. Here, the reservoir housing 66 is arranged outside of the chambers 26 and 30 and thus outside of the hydraulic housing 24 and outside of the housing 38 and thus outside of the work chamber 40. In the first embodiment, the sliding element 56 is a second piston provided in addition to the piston 42, which can be shifted along the second movement direction relative to the reservoir housing 66. Here, a second piston rod 68 is provided, which can be shifted along with the sliding element 56 along the second movement direction relative to the reservoir housing 66. For example, by means of actuators 69, the sliding element 56 can be shifted, in particular via the piston rod 68, along the second movement direction relative to the reservoir housing 66, in order to bring about volume increases and volume reductions of the reservoir chamber 64 thereby.

The reservoir housing 66 is fluidically connected, for example, to the housing 38 in such a manner that the reservoir chamber 64 is fluidically connected via an additional conduit element 70 to the work chamber 40. For example, if the volume of the reservoir chamber 64 is thus decreased, in that the sliding element 56 or the piston rod 68 is shifted into the reservoir housing 66, then at least a portion of the fluid 28 initially accommodated in the reservoir chamber 64 is conveyed via the conduit element 70 out of the reservoir chamber 64 and conveyed into the work chamber 40 and thus into the housing 38. As a result, the clearance A is increased. In order to reduce the size of the reservoir chamber 64 and its volume, for example, the sliding element 56 is moved in the first direction shown by the arrow 60 relative to the reservoir housing 66. In order to increase, for example, the volume of the reservoir chamber 64, the sliding element 56 or the piston rod 68 is moved in the second direction shown by the arrow 62 relative to the reservoir housing 66. Thereby, at least a portion of the fluid 28 initially accommodated in the work chamber 40 is conveyed via the conduit element 70 out of the work chamber 40 and thus out of the housing 38 and conveyed into the reservoir chamber 64 and thus into the reservoir housing 66. Thereby, the clearance A is decreased. Overall, it can be seen that, for the height adjustment of the body 12, by means of the sliding element 56, by shifting of the sliding element 56 relative to the housing 38 and relative to the reservoir housing 66, at least a portion of the fluid 28 is conveyed out of the housing 38 and is conveyed into the reservoir chamber 64 and thus into the reservoir housing 66, and additional fluid 28 is conveyed out of the reservoir chamber 64 and thus out of the reservoir housing 66 and is conveyed into the housing 38 or into the work chamber 40.

The aforementioned actuator 69 can be operated, for example, electrically and/or mechanically and/or hydraulically and/or pneumatically and/or electromechanically. In particular, a preferably self-locking threaded spindle can be provided, by means of which the sliding element 56 can be shifted back and forth along the second movement direction relative to the reservoir housing 66, in particular via the piston rod 68. The hydraulic housing 24 can be immobile relative to the housing 38. For this purpose, the hydraulic housing 24 is, for example, at least indirectly, in particular directly, secured on the housing 38. Thus, the hydraulic housing 24 can be moved, for example along with the housing 38 relative to the body 12 along the first movement direction. Alternatively, it is conceivable that the hydraulic housing 24 is immobile relative to the body 12, wherein the hydraulic housing 24 is, for example, at least indirectly, in particular directly, secured on the housing 12.

It is possible for the reservoir housing 66 to be immobile relative to the housing 38. For this purpose, the reservoir housing 66 is at least indirectly, in particular directly, fastened on the housing 38. Thus, for example, the reservoir housing 66 can be moved along with the housing 38 along the first movement direction relative to the body 12. Alternatively, the reservoir housing 66 can be immobile, for example, relative to the body 12. For this purpose, for example, the reservoir housing 66 is at least indirectly, in particular directly, fastened on the body 12. The respective conduit element 68 or 70 can be a flexible and/or a non-rigid conduit, or the conduit element 48 or 70 is, for example, intrinsically rigid and thus dimensionally stable, and/or a bore, in particular in a housing of the spring damper apparatus 10.

Overall, it can be seen that the fluid which, by shifting of the sliding element 56 relative to the housing 38, can be conveyed out of the housing 38 and conveyed into the housing 38, in order to change the clearance A thereby, is a fluid volume designed, for example, as oil volume, which is shifted or displaced by shifting of the sliding element 56 relative to the housing 38. By shifting of the fluid volume, the clearance A can be changed in a particularly simple way.

The spring damper apparatus 10, in particular the design thereof, is based in particular on the following findings: In a conventional damper, in particular a hydraulic damper, for example, the wheel load is braced by the supporting spring, and the damper damps the body movements and thus stabilizes the vehicle. An enclosed gas volume including, for example, at least nitrogen, is not compressed or only slightly compressed and enables the piston rod in the damper tube to be shifted in and out, wherein the gas volume is compressed or relaxed. In a partially supporting hydropneumatic system, the mechanical spring 50, also referred to as supporting spring and designed as a coil spring, as a leaf spring or a different type of spring, is unloaded in particular with respect to the above-described conventional damper, and a portion of the wheel load or of the load or unloaded weight is borne by the gas spring 34. This is possible since, for example, the gas volume is clearly greater in comparison to conventional dampers and the gas 32 is strongly compressed in comparison to conventional dampers.

Since, the partially supporting hydropneumatic system, the gas spring 34 is supporting and thus the gas 32 or the gas spring 34 is preloaded, the piston rod 44 can be moved in and out by shifting of the aforementioned fluid volume into the work chamber 40 or by shifting of the fluid volume out of the work chamber 40. Thereby, it is also possible to regulate, that is to say to adjust, the clearance A also designated as level or vehicle level, for example, as in an air spring system, wherein the varying of the clearance A in the spring damper apparatus 10 can occur considerably more simply and thus more cost-effectively than in conventional air spring systems. The shifting of the fluid volume occurs in fact in the spring damper apparatus 10 not by means of a hydraulic pump and thus not by rotating a conveyor element which, for example, in addition can convey fluid into the work chamber 40 or convey fluid out of the work chamber 40, but by shifting of the sliding element 56. In other words, in the spring damper apparatus 10, it is provided that the moving of the piston rod 44 in and out brought about in a particular simple way by the shiftable fluid volume or by the shiftable sliding element 56. In the first embodiment, with respect to the work chamber 40 and the chambers 26 and 30, the additional reservoir chamber 64 and thus the additional reservoir housing 66 are located outside of the damper 36 and thus outside of the housing 38 or of the work chamber 40 and also outside of the hydraulic housing 24 and thus outside of the chambers 26 and 30. The fluid 28 here is accommodated in the chamber 26, in the conduit element 48, in the work chamber 40, in the conduit element 70 and in the reservoir chamber 64.

Figure 2:
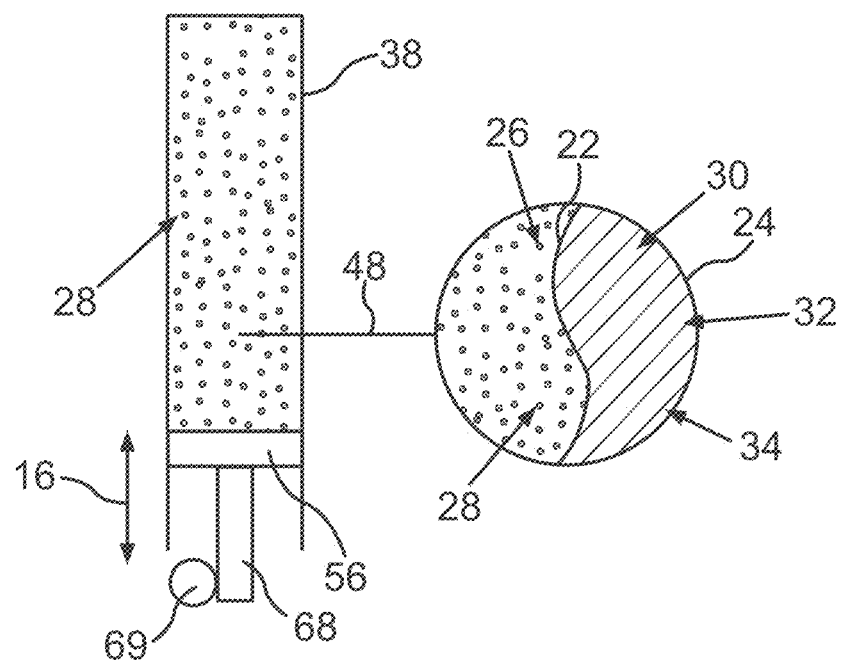
FIG. 2 a diagrammatic cross-sectional view of a section of the spring damper apparatus according to a second embodiment.

FIG. 2 shows a second embodiment of the spring damper apparatus 10 in a diagrammatic and sectional side view of a section. In the second embodiment, the sliding element 56 is integrated in the damper 36, in particular in the housing 38. Here, the sliding element 56 is accommodated in the housing 38 and can be shifted along the first movement direction relative to the housing 38. Thus, in the second embodiment, the first movement direction and the second movement direction coincide. In particular, the sliding element 56 which is preferably designed as an additional piston is arranged opposite the piston 42 along the first movement direction or along the second movement direction. In the second embodiment, for the height adjustment of the body 12, by means of the sliding element 56, by shifting of the sliding element 56 relative to the housing 38, a fluid column which is formed by the fluid 28 accommodated in the housing 38 and which is accommodated in the housing 38 can be shifted relative to the housing 38, in particular along the bracing direction or along the first or second movement direction. For example, the work chamber 40 is also partially limited by the sliding element 56, in particular in vehicle vertical direction downward. Thus, for example, the sliding element 56 forms a damper bottom. If the sliding element 56 is shifted along the first movement direction and here, for example, in vehicle vertical direction upward or toward the body 12, then, thereby, the fluid column is shifted in vehicle vertical direction upward or in direction of the body 12. Subsequently, the piston rod 44 is moved out of the housing 38, and the clearance A is increased. On the other hand, if the sliding element 56 is moved in vehicle vertical direction downward, or, in particular in the first movement direction, away from the body 12, then, thereby, the fluid column is moved along the first movement direction away from the body 12 or in vehicle vertical direction downward, in particular away from the body 12, whereby the piston rod 44 is retracted into the housing 38.

The second embodiment is particularly advantageous if the damper 36, in particular the housing 38, is connected by means of a clamp to a wheel mount and subsequently the damper bottom is freely accessible. This means, for example, that the damper 36, in particular the housing 38, on its end facing the wheel 14, does not comprise a bearing eye and is thus free of a bearing eye. This can in particular be provided in the case of a MacPherson axle. Here, the wheel 14, in particular a wheel hub, is rotatably mounted on the aforementioned wheel support.

The invention claimed is:

1. A spring damper apparatus for a vehicle, with a hydropneumatic system, via which at least one wheel of the vehicle can be braced spring-mounted and damped on a body of the vehicle, wherein the hydropneumatic system comprises:
   a first chamber delimited at least partially by a partition element, in which a fluid acting on the partition element is accommodated,
   a second chamber separated from the first chamber by the partition element and at least partially delimited by the partition element, in which a gas forming a gas spring and acting on the partition element is accommodated,
   a housing in which the fluid is accommodated, and
   a piston shiftably accommodated in the housing and acting on the fluid accommodated in the housing, via which piston the wheel is braced on the body, wherein, by the piston, by shifting of the piston relative to the housing, a pressure is exerted on the fluid accommodated in the housing and in the first chamber, and thereby, via the fluid, the partition element is at least partially moved, whereby a volume reduction of the second chamber and thereby a compression of the gas in the second chamber is brought about,
   wherein
   at least one sliding element is provided in addition to the piston and in addition to the partition element and shiftable relative to the housing,
   a height adjustment of the body is performed by a shifting of the sliding element relative to the housing,
   the shifting of the sliding element relative to the housing is performed by an actuator, and
   by the shifting of the sliding element relative to the housing:
   at least a portion of the fluid is conveyed out of the housing and additional fluid is conveyed into the housing, or
   a fluid column which is formed by the fluid accommodated in the housing and which is accommodated in the housing is shifted within the housing relative to the housing.

2. The spring damper apparatus according to claim 1, wherein the hydropneumatic system is designed as a partially or fully supporting hydropneumatic system, the gas spring of which at least partially receives a load of the vehicle, whereby the gas spring is preloaded.

3. The spring damper apparatus according to claim 2, wherein a mechanical spring which receives the load as a second portion, whereby the mechanical spring is preloaded, is associated with the hydropneumatic system designed as partially supporting hydropneumatic system, the gas spring of which receives the load as a first portion.

4. The spring damper apparatus according to claim 3, wherein a reservoir chamber provided in addition to the first chamber and in addition to the second chamber and arranged outside of the housing, which is partially delimited by a reservoir housing provided in addition to the housing and which is partially delimited by the sliding element which is shiftable relative to the reservoir housing, by which, for the height adjustment of the body, by shifting of the sliding element relative to the housing and relative to the reservoir housing, at least the portion of the fluid can be conveyed out of the housing and into the reservoir chamber, and the additional fluid can be conveyed out of the reservoir chamber and into the housing.

5. The spring damper apparatus according to claim 3, wherein the sliding element is arranged in the housing, in particular opposite the piston, so that, for the height adjustment of the body, by the sliding element, by shifting of the sliding element relative to the housing, the fluid column accommodated in the housing can be shifted relative to the housing.

6. The spring damper apparatus according to claim 2, wherein a reservoir chamber provided in addition to the first chamber and in addition to the second chamber and arranged outside of the housing, which is partially delimited by a reservoir housing provided in addition to the housing and which is partially delimited by the sliding element which is shiftable relative to the reservoir housing, by which, for the height adjustment of the body, by shifting of the sliding element relative to the housing and relative to the reservoir housing, at least the portion of the fluid can be conveyed out of the housing and into the reservoir chamber, and the additional fluid can be conveyed out of the reservoir chamber and into the housing.

7. The spring damper apparatus according to claim 2, wherein the sliding element is arranged in the housing, in particular opposite the piston, so that, for the height adjustment of the body, by the sliding element, by shifting of the sliding element relative to the housing, the fluid column accommodated in the housing can be shifted relative to the housing.

8. The spring damper apparatus according to claim 1, wherein a reservoir chamber provided in addition to the first chamber and in addition to the second chamber and arranged outside of the housing, which is partially delimited by a reservoir housing provided in addition to the housing and which is partially delimited by the sliding element which is shiftable relative to the reservoir housing, by which, for the height adjustment of the body, by shifting of the sliding element relative to the housing and relative to the reservoir housing, at least the portion of the fluid can be conveyed out of the housing and into the reservoir chamber, and the additional fluid can be conveyed out of the reservoir chamber and into the housing.

9. The spring damper apparatus according to claim 8, wherein the reservoir housing is immobile relative to the housing.

10. The spring damper apparatus according to claim 9, wherein the reservoir housing is indirectly or directly secured on the housing and thereby immobile relative to the housing.

11. The spring damper apparatus according to claim 10, wherein the reservoir housing is immobile relative to the body.

12. The spring damper apparatus according to claim 11, wherein the reservoir housing is indirectly or directly secured on the body and thereby immobile relative to the body.

13. The spring damper apparatus according to claim 9, wherein the reservoir housing is immobile relative to the body.

14. The spring damper apparatus according to claim 13, wherein the reservoir housing is indirectly or directly secured on the body and thereby immobile relative to the body.

15. The spring damper apparatus according to claim 8, wherein the reservoir housing is immobile relative to the body.

16. The spring damper apparatus according to claim 15, wherein the reservoir housing is indirectly or directly secured on the body and thereby immobile relative to the body.

17. The spring damper apparatus according to claim 1, wherein the sliding element is arranged in the housing, so that, for the height adjustment of the body, by the sliding element, by shifting of the sliding element relative to the housing, the fluid column accommodated in the housing can be shifted relative to the housing.

18. The spring damper apparatus according to claim 1, wherein the actuator is a self-locking threaded spindle.

19. The spring damper apparatus according to claim 1, wherein the shifting of the sliding element relative to the housing is performed by the actuator via a piston rod coupled to the sliding element.

20. A vehicle with a body, with at least one wheel, and with at least one spring damper apparatus which comprises a hydropneumatic system, via which the wheel is braced spring-mounted and damped on the body, wherein the hydropneumatic system comprises:

a first chamber delimited at least partially by a partition element, in which a fluid acting on the partition element is accommodated, a second chamber separated from the first chamber by the partition element and delimited at least partially by the partition element, in which a gas forming a gas spring and acting on the partition element is accommodated, a housing in which the fluid is accommodated, and a piston shiftably accommodated in the housing and acting on the fluid accommodated in the housing, via which piston the wheel is braced on the body, wherein, by the piston, by shifting of the piston relative to the housing, a pressure is exerted on the fluid accommodated in the housing and in the first chamber, and thereby, via the fluid, the partition element is at least partially moved, whereby a volume reduction of the second chamber and thereby a compression of the gas in the second chamber is brought about, wherein at least one sliding element is provided in addition to the piston and in addition to the partition element and shiftable relative to the housing, a height adjustment of the body is performed by a shifting of the sliding element relative to the housing, the shifting of the sliding element relative to the housing is performed by an actuator, and by the shifting of the sliding element relative to the housing:

at least a portion of the fluid is conveyed out of the housing and additional fluid is conveyed into the housing, or a fluid column which is formed by the fluid accommodated in the housing and which is accommodated in the housing is shifted within the housing relative to the housing.

* * * * *